United States Patent Office 3,311,330
Patented Mar. 28, 1967

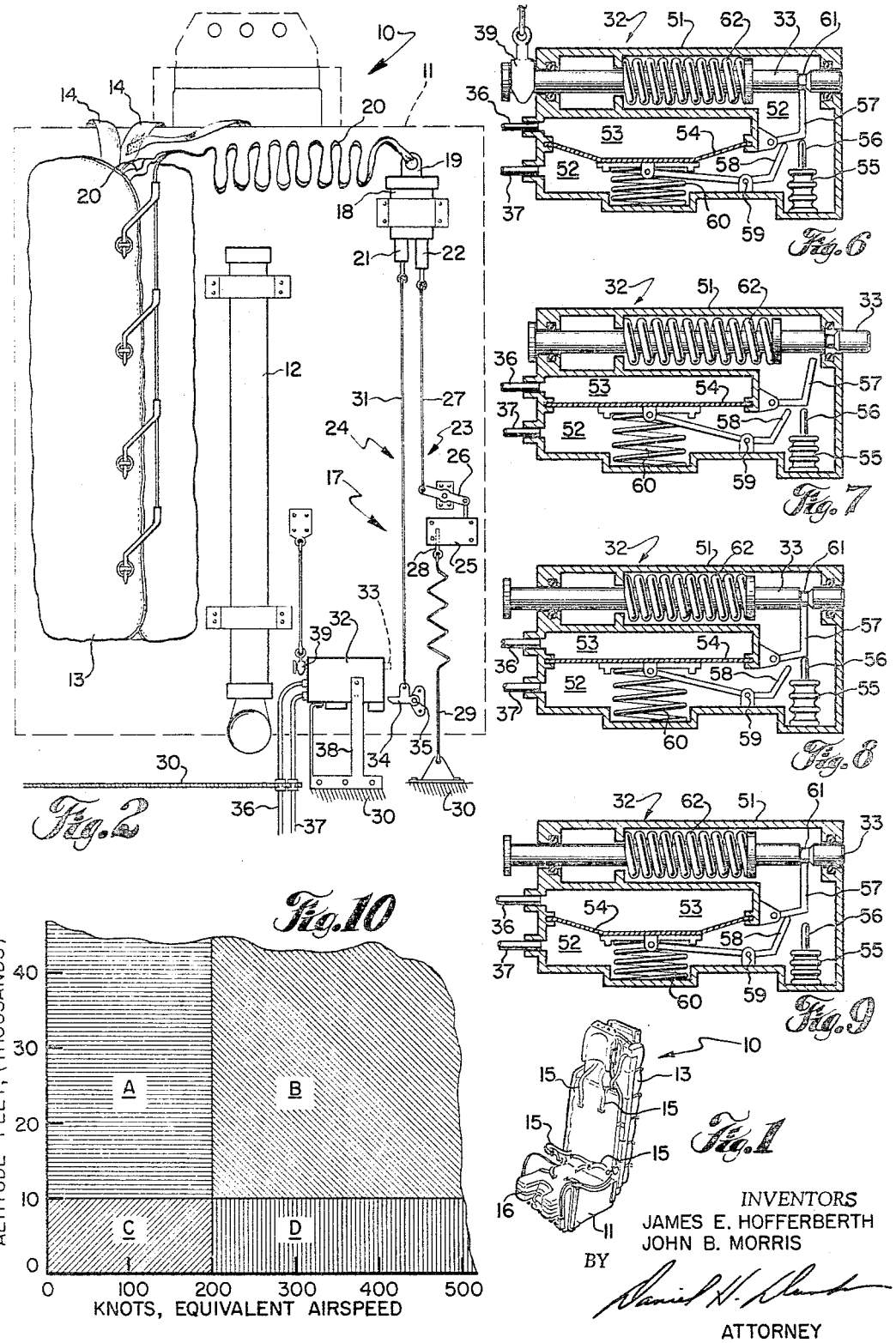

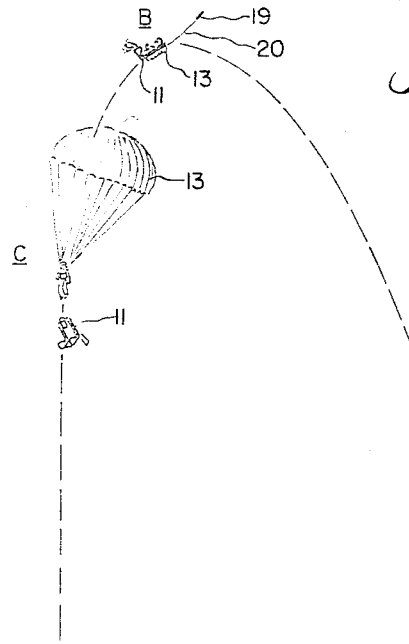
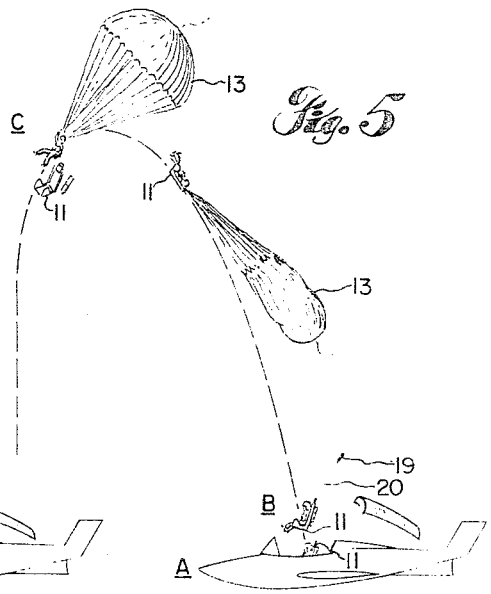
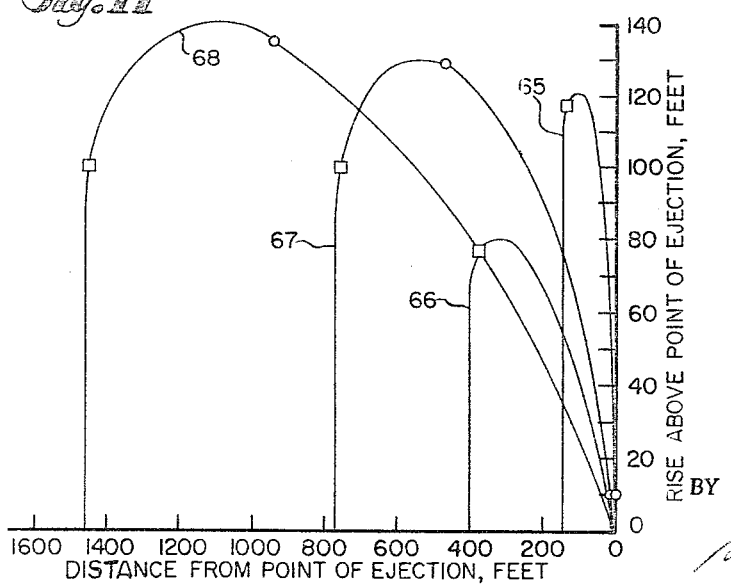
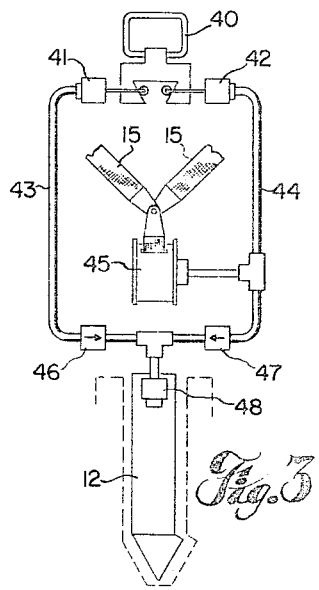

3,311,330
AIRCRAFT EJECTION SEAT SYSTEM
James E. Hofferberth, Worthington, and John B. Morris, Reynoldsburg, Ohio, assignors to North American Aviation, Inc.
Filed June 22, 1965, Ser. No. 466,025
4 Claims. (Cl. 244—141)

This invention relates generally to an aircraft ejection seat system, and particularly concerns a rocket-powered ejection seat having a personnel-type parachute means that is deployed to effect complete occupant emergency recovery throughout a range of aircraft operating conditions extending from zero airspeed to comparatively high airspeeds (e.g., 500 knots equivalent airspeed) and from zero altitude upward.

Known ejection seat systems for aircraft have typically utilized a nearly immediately-deployed personnel parachute means to effect occupant recovery in situations wherein the emergency develops at comparatively low airspeeds and within a pre-selected altitude range. Other known aircraft ejection seat systems have typically utilized sequentially-deployed seat stabilization parachute means and separate personnel-type parachute means to effect recovery of the seat occupant in emergency situations initially involving comparatively high aircraft operating airspeeds and within a pre-selected altitude range. The seat stabilization parachute means in such systems serves to minimize otherwise eventually-induced adverse seat and occupant tumbling as well as to rapidly reduce seat airspeed to a level which will permit safe personnel parachute means deployment.

We have discovered that important weight savings may be realized over known ejection seat systems having high airspeed recovery capabilities without sacrificing system emergency performance capabilities by the practice of the herein described and claimed invention, and particularly without any reduction to an incorporated zero airspeed, zero altitude recovery capability.

Bascially, the aircraft ejection seat system of our invention utilizes a single parachute means of the conventional personnel-type to accomplish occupant recovery in high airspeed emergency situations. By use of a suitable parachute deployment delay means of fixed delay duration, the seat structure is permitted to naturally decelerate after ejection to a safe parachute deployment speed and without incurring seat instability or occupant tumbling over a threshold level. The invention is further provided with a pressure-responsive selector means that functions in low airspeed situations within the pre-selected altitude range to initiate an override means that deploys the personnel-type parachute means with a substantially lesser delay that essentially allows only for system clearance relative to the incorporating aircraft.

Accordingly, an important object of this invention is to provide an aircraft ejection seat system that is capable of effecting complete safe occupant recovery from all emergency situations occurring throughout a range of aircraft operating conditions extending from zero airspeed to comparatively high airspeeds (e.g., 500 knots equivalent airspeed) and from zero altitude upwards (e.g., to 45,000 feet altitude).

Another object of the invention is to provide an aircraft ejection seat system with means whereby complete safe occupant recovery may be effected from comparatively high airspeed aircraft operating situations (e.g., in the range of from 200 knots to 500 knots equivalent airspeed) and also from zero altitudes upward (e.g., in the range of from 0 feet to 45,000 feet altitude) without requiring the use of seat stabilization parachute means to minimize seat and occupant tumbling.

A still further object of our invention is to provide an aircraft ejection seat system with pressure-responsive selector means that functions to automatically select that one of alternate modes of system operation which will provide optimum system occupant recovery performance.

Other objects and advantages of the invention will become apparent from a careful consideration of the description, claims, and drawings which follow.

In the drawings:

FIG. 1 is a general perspective view of an aircraft ejection seat system provided with a preferred embodiment of our invention;

FIG. 2 is a schematic illustration of the principal components of the aircraft ejection seat system of FIG. 1 and our invention in their cooperating relation to each other and with the incorporating aircraft;

FIG. 3 is a schematic illustration of a sub-system preferably incorporated in the aircraft ejection seat system of FIG. 1 for use in initiating system operation in an aircraft emergency situation;

FIG. 4 illustrates the basic mode of operation of the system of FIGS. 1 and 2 as in aircraft emergency situations occurring in the range of comparatively high airspeeds (e.g., from 200 knots to 500 knots equivalent airspeed);

FIG. 5 illustrates the override mode of operation of the system of FIGS. 1 and 2 as in aircraft emergency situations occurring in the range of comparatively low airspeeds (e.g., from 0 knots to 200 knots equivalent airspeed) and altitudes within a pre-selected range (e.g., a range from 0 feet to 10,000 feet altitude);

FIGS. 6 through 9 illustrate the typical operating conditions experienced with the system operating mode selector means of FIG. 2;

FIG. 10 graphically illustrates the airspeed-altitude envelopes of the different basic selector means conditions shown in FIGS. 6 through 9 as a function of particular airspeed and altitude parameter values; and FIG. 11 graphically illustrates the system escape trajectories (relative to point of system operation initiation) that are obtained throughout a range of aircraft operating conditions for which an actual embodiment of the system of FIGS. 1 and 2 has performed.

FIG. 1 perspectively illustrates the general arrangement of an aircraft ejection seat system 10 having the features of our invention incorporated therein in a preferred embodiment. Such system includes a basic seat structure 11 which is occupied by the aircraft operator (pilot) and which is ejected from within the aircraft in an emergency situation (after aircraft canopy removal) and by the rear-attached conventional rocket-catapult unit 12 (FIG. 2). The system also includes a personnel-type parachute means 13 (normally enclosed in a readily opened protective cover in a manner permitting ready removal) also mounted on the rear of seat structure 11. Parachute straps 14 (FIG. 2) connect the parachute means to the body harness (not shown) typically worn by the seat occupant in a conventional manner. Known releasable restraining harness means 15 may also be provided in the seat system to properly pre-position and restrain the seat occupant at the time of and during initial portions of the system escape trajectory. Separation of the seat occupant from structure 11 is essentially accomplished in one actual embodiment of our invention subsetantially in the manner taught by P. S. Letters Patent No. 3,020,011. Seat cushion 16 may also be provided in system 10 in the additional form of a container for survival equipment and supplies.

The principal functional component of our invention are further illustrated in FIGS. 2 and 3. The details of FIG. 2 disclose the means 17 which functions to automatically select the preferred mode of two available modes of system operation at the time of ejection-initiating action. FIG. 3, on the other hand, discloses details of the components that function to initiate overall system operation.

Means 17 includes ballistically-functioning deployment gun 18 mounted at the rear of seat structure 11; such gun includes a deployment slug 19 that is attached to the canopy portion of parachute means 13 in deploying relation by lanyard means 20. Gun 18 is powered by either one of fixed-time delay cartridges 21 or 22 depending on the mode of system operation selected by means 17. The means for properly initiating actuating either of elements 21 and 22 is comprised of dual, parallel initiator means 23 and 24.

Initiator means 23 includes a conventional aneroid-blocked power device 25 that rotates lever 26 when actuated to operate firing lanyard 27 connected to delay cartridge 22 thereby energizing gun 18 with a fixed comparatively long time delay (e.g., 2.0 seconds) that essentially is responsible for accomplishing seat deceleration. Device 25 typically includes a pre-compressed compression spring (not shown) that provides the necessary actuating power for leaver 26 and that is safety-locked in a loaded condition by removable pin 28. A lanyard 29 is connected to both removable pin 28 and to supporting aircraft structure 30. Thus, cartridge means 22 is always fired in the course of an emergency ejection because of the withdrawal of pin 28 in all cases as the seat system is forcibly ejected from within and with respect to supporting structure 30. It should be further noted that power device 25 typically includes an aneroid-type block which functions to further prevent rotation of lever 26 by the contained compressed spring at all altitudes outside a pre-selected range (e.g., from 0 feet to 10,000 feet altitude). Thus, when system 10 is ejected at an altitude condition outside the desired range (e.g., 15,000 feet altitude), the initiation or firing of cartridge 22 will be further delayed until such time as the seat has fallen to within the pre-selected range. Stated in another manner, the fixed-time deceleration delay provided by cartridge 22 commences: (1) almost concurrent with seat system initiation at altitude levels below the upper limit of the range set into the aneroid block portion of device 25 (and if not overridden by initiator means 24 as hereinafter explained), or (2) as seat structure 11 falls to below the upper limit of the range set into the aneroid block portions of device 25 in those instances where system initiation occurs at altitude levels above such upper limit.

The initiator means 24 portion of means 17 develops an override function with respect to initiator means 23. Basically, initiator means 24 includes a lanyard 31, and an override selector means 32 having a trip stud element 33 that is projected into the ejection path of trip lever 34 prior to any significant upward movement of structure 11 relative to structure 30 if the aircraft environment situation involves an airspeed in the comparatively low airspeed range and an altitude in the pre-selected altitude range. Means 24 also includes the pivot 35 about which trip lever 34 rotates. Selector unit 32 receives sensed dynamic and static pressure conditions of the aircraft environment through tube elements 36 and 37, respectively, of a Pitot device. Selector unit 32 is mounted to aircraft structure 30 by means of the bracket designated 38. A safety device 39 in the form of a seat-connected removable yoke member engages the non-tripping end of trip stud 33 to prevent the accidental projection of stud 33 into the path of lever 34 prior to system initiation.

FIG. 3 illustrates schematically those conventional components which may be utilized to initiate operation of entire system 10. The arrangement therein includes a handle 40 which, when pulled upward, actuates both of parallel-installed gas generator devices 41 and 42. High-pressure gases generated by devices 41 and 42 are ported through parallel-installed lines 43 and 44 to actuate restraint harness reel 45 and also rocket-catapult unit primer 48. Reel 45 is of conventional design and operates to position harness straps 15 at a preferred position relative to seat structure 11 so as to properly position and restrain the seat occupant at the time of system 10 initiation. One-way check valves 46 and 47 prevent high-pressure gases from devices 41 and 42 from being accidentally exhausted through an opposite line in bypass relation to primer 48. Ignition of primer 48 results in the firing of rocket-catapult unit 12.

As previously mentioned, initiator means 23 is actuated in all ejections of system 10 and establishes a fixed-time deceleration delay of considerable duration (e.g., 2.0 seconds) through cartridge means 22. The resulting delayed deployment and opening of parachute means 13 is accomplished without imposing adversely severe loadings on the parachute means and also without subjecting the seat and seat occupant to intolerable levels of instability and tumbling.

Initiator means 24 is actuated only to accomplish an override function relative to means 23. In the system of our invention the override function is undertaken only to effect a preferred mode of operation and optimum recovery capability in situations involving comparatively low airspeeds (e.g., 200 knots equivalent airspeed or less) and altitudes within the previously mentioned pre-selected altitude range. When initiator means 24 actuates cartridge device 21, the system is provided with an overriding comparatively short (e.g., 0.1 second) fixed-time clearance delay to assure that system 10 will clear all adjacent aircraft structure prior to parachute means deployment.

FIGS. 4 and 5 illustrate the two basic modes of operation for system 10 to thereby develop an improved system escape recovery capability without requiring the deployment of a separate stabilization parachute means. The mode of FIG. 4 is the base mode initiated by initiator means 23. The delay from position 4A (initiation of the system) to 4B (parachute deployment initiation) basically corresponds to comparatively long fixed-time deceleration delay developed by cartridge means 22. (In those instances wherein position 4A occurs at altitude levels above the upper limit value set in the aneroid block portion of device 25, the cartridge delay is further supplemented by the additional time required for the system to reach such altitude upper limit value.) Even with system high speed ejections occurring at near-zero flight altitudes, parachute means 13 becomes fully inflated (position 4C) before the occupant reaches ground level.

The mode of operation of FIG. 5 is the override mode initiated by initiator means 24. In such mode the delay from position 5A (system initiation) to 5B (parachute deployment initiation) corresponds to the comparatively short fixed-time clearance delay established by cartridge means 21 in override relation to the longer delay of cartridge means 22. Again, system 10 performs in a manner whereby parachute means 13 is fully inflated (position 5C) before the seat occupant reaches ground level.

FIGS. 6 through 9 schematically details the principal components of override selector means 32 as contained within the housing designated 51. Static pressure line 37 passes through housing 51 and communicates with primary chamber 52; dynamic pressure line 36 also passes through housing 51 but communicates with separated secondary chamber 53. Diaphragm means 54 in part serves to accomplish the separation. An extensible and retractable bellows member 55 is contained within chamber 52 and is secured at one end to housing 51. The other end of bellows 55 carries a probe 56 that cooperates with rotatable locking lever 57 depending on the existing sensed environmental dynamic and static pressure conditions. Probe 56 (and lever 57) is moved relative to housing 51 in response to aircraft exterior static pressure changes due to aircraft altitude changes; such pressure changes as related to a pre-determined upper limit value (e.g., 10,000 feet altitude) for a pre-selected altitude range (e.g., 0 feet to 10,000 feet altitude) cause locking lever 57 to either be retained within or freed from engagement with groove 61 of stud 33.

Locking lever 57 is also acted upon by lever arm 58 driven by diaphragm 54 about pivot means 59. Diaphragm 54 also preferably is opposed in downward movement by compression spring means 60. The free end of lever 57, when engaged with the undercut groove 61 of trip stud 33, prevents projection movement of stud 33 by pre-loaded compression spring 62 even if safety member 39 is disengaged from stud 33 by initial ejection seat movement. In those instances wherein locking lever 57 is not engaged with groove 61 at the time of initial seat movement and safety means 39 removal, pre-loaded spring means 62 will drive one end of stud 33 into the ejection path of trip lever 34 to thus cause the firing of cartridge means 21 by lanyard 31.

The bellows, diaphragm, lever, and stud element positions shown in FIGS. 6 through 9 illustrate the typical conditions that exist within selector means 32 throughout a complete range of aircraft operating conditions. Diaphragm member 54 is shown in a position responsive to a comparatively high aircraft airspeed in FIGS. 6 and 9; in such position it acts through lever 58 to maintain locking lever 57 in engaged relation to groove 61 regardless of altitude (static pressure) condition. Conversely, the diaphragm 54 position of FIGS. 7 and 8 is associated with comparatively low aircraft airspeeds (e.g., less than approximately 200 knots equivalent airspeed). Bellows member 55 is shown in a position responsive to a comparatively high aircraft operating altitude in FIGS. 6 and 8; in such position it also acts to maintain locking lever 57 in engaged relation to groove 61 regardless of aircraft airspeed (dynamic pressure) but through probe 56 rather than through lever 58. The bellows 55 positions of FIGS. 7 and 9 are associated with environmental conditions involving comparatively high static pressures (e.g., below an upper limit value of 10,000 feet altitude for a pre-selected altitude range of 0 feet to 10,000 feet altitude). Thus, only in their FIG. 7 positions corresponding to an essentially low airspeed condition within the pre-selected base altitude range do members 56 and 58 not restrain locking lever 57 from free disengagement with groove 61 in stud 33. In the FIG. 7 condition selector means 32 will perform to develop the required override function as seat structure 11 is initially moved relative to aircraft structure 30 to inactivate safety device 39 and to activate trip lever 34 thus firing cartridge means 21.

In FIG. 10 we provide a graphic illustration of parameter envelopes selected for an actual embodiment of our invention. The areas designated A, B, C, and D, cover the conditions developed in FIGS. 8, 6, 7, and 9, respectively. The values selected for engagement-disengagement of components 57, 61 were 10,000 feet altitude for the altitude parameter and 200 knots equivalent airspeed for the aircraft airspeed parameter.

FIG. 11 graphically illustrates the typical escape trajectories that have been obtained with an actual embodiment of our invention. Curves 65 through 68 indicate seat displacements relative to the point of system initiation for various aircraft flight conditions ranging from zero airspeed to 500 knots equivalent airspeed both with and without an included comparatively long fixed-time deceleration delay. Curve 65 shows the escape trajectory experienced at an aircraft airspeed condition and with override functioning developed through initiator means 24. Curves 66 and 67 both represent the trajectories obtained at approximately 200 knots aircraft equivalent airspeed; curve 66 differs from curve 67 in that the associated trajectory is influnced by the override action of initiator means 24. Curve 67, on the other hand, is representative of seat displacement in a just-above 200 knot equivalent airspeed aircraft emergency situation and with the comparatively long time delay developed by the firing of cartridge means 22 only. The trajectory of curve 68 occurs with an approximately 500 knot equivalent aircraft airspeed with the long time delay. In each curve the small circular notation indicates the point of firing deployment slug 19 and the small square notation indicates the point of complete parachute means 13 canopy deployment.

It is understood that the forms of the invention herewith shown and described are to be taken as preferred embodiments of the same, but that various changes in the proportioning, size, and detail of parts may be resorted to without departing from the spirit of the invention or the scope of the subjoined claims.

We claim:

1. In an ejection seat system for aircraft and the like and to be supported by and within aircraft structure, in combination:
    (a) seat structure supported by said aircraft structure and combined with means for forcibly ejecting said seat structure and the occupant thereof from said aircraft structure into an environmental airstream,
    (b) personnel parachute means,
    (c) dual parallel parachute deployment initiator means one of which deploys said personnel parachute means with a fixed-time clearance delay when actuated and the other of which deploys said personnel parachute means with a fixed-time deceleration delay that is substantially greater in duration compared to said clearance delay, and
    (d) pressure-sensing and pressure-responsive selector means for selectively actuating said one parachute deployment initiator means having a fixed-time clearance delay in override relation to said other parachute deployment initiator means having a fixed-time deceleration delay of greater duration, said other parachute deployment initiator means being actuated as said seat structure is initially moved relative to said aircraft structure throughout an entire range of aircraft airspeeds, and said selector means actuating said one parachute deployment initiator means when sensing a dynamic pressure condition associated with the lower airspeeds portion of said entire range of airspeeds.

2. The aircraft ejection seat system defined by claim 1, wherein said other parachute deployment initiator means is additionally actuated throughout an entire range of aircraft altitudes as said seat structure is initially moved relative to said aircraft structure, said selector means actuating said one parachute deployment initiator means only when additionally sensing a static pressure condition associated with a lower pre-selected range of aircraft altitudes within said entire range of aircraft altitudes.

3. The ejection seat system for aircraft and the like defined by claim 1, wherein said fixed-time deceleration delay is of approximately 2 seconds duration and wherein said fixed-time clearance delay is not greater in duration than approximately $\frac{1}{10}$ of said fixed-time deceleration delay.

4. The ejection seat system for aircraft and the like defined by claim 2, wherein said entire range of aircraft altitudes is substantially in excess of a range of 0 feet altitude to approximately 10,000 feet altitude, said pre-selected range of aircraft altitudes extending from 0 feet altitude to approximately 10,000 feet altitude.

References Cited by the Examiner
UNITED STATES PATENTS 3,191,892  6/1965  Fuller et al. _____ 244—122

MILTON BUCHLER, *Primary Examiner.*

A. E. CORRIGAN, *Assistant Examiner.*